United States Patent
Sun et al.

(10) Patent No.: US 8,199,198 B2
(45) Date of Patent: Jun. 12, 2012

(54) BRIGHT SPOT DETECTION AND CLASSIFICATION METHOD FOR A VEHICULAR NIGHT-TIME VIDEO IMAGING SYSTEM

(75) Inventors: Qin Sun, Kokomo, IN (US); Manoj Dwivedi, Bangalore (IN); John R. Bailey, Westfield, IN (US); Su-Birm Park, Aldenhoven (DE)

(73) Assignee: Delphi Technologies, Inc., Troy, MI (US)

( * ) Notice: Subject to any disclaimer, the term of this patent is extended or adjusted under 35 U.S.C. 154(b) by 1348 days.

(21) Appl. No.: 11/879,853

(22) Filed: Jul. 18, 2007

(65) Prior Publication Data
US 2009/0021581 A1    Jan. 22, 2009

(51) Int. Cl.
*H04N 7/18* (2006.01)
(52) U.S. Cl. ........................................ 348/148
(58) Field of Classification Search .................... 348/148
See application file for complete search history.

(56) References Cited

U.S. PATENT DOCUMENTS

| | | | |
|---|---|---|---|
| 6,255,639 B1 | 7/2001 | Stam et al. | |
| 2007/0165967 A1* | 7/2007 | Ando et al. | 382/291 |
| 2007/0182528 A1* | 8/2007 | Breed et al. | 340/435 |
| 2007/0221822 A1* | 9/2007 | Stein et al. | 250/205 |
| 2007/0255480 A1* | 11/2007 | Southall et al. | 701/96 |
| 2007/0263901 A1* | 11/2007 | Wu et al. | 382/104 |
| 2008/0042812 A1* | 2/2008 | Dunsmoir et al. | 340/435 |

OTHER PUBLICATIONS

Stam, Joseph, Automatic Vehicle High-Beam Headlamp Control System, SAE Paper No. 2001-01-0318, 2001.

* cited by examiner

*Primary Examiner* — Lynn Feild
*Assistant Examiner* — Lin Liu
(74) *Attorney, Agent, or Firm* — Lawrence D. Hazelton (57) ABSTRACT

Bright spots imaged by a forward-looking monochrome video camera during night-time operation of a host vehicle are detected and classified to determine the presence of leading and on-coming vehicles. A specified region-of-interest in each image frame is globally scanned to adaptively detect the bright spot contours, and search windows bounding the larger bright spot contours are locally scanned to adaptively detect individual bright spot contours that were fused in the global scan. A sensitive area within the region-of-interest is locally scanned to adaptively detect dim taillights of a leading vehicle, and path prediction of the host vehicle is used for frame-to-frame tracking of detected spots. Detected spots are classified depending on their location and frame-to-frame movement within the region-of-interest and their glare and pairing characteristics.

9 Claims, 13 Drawing Sheets

BRIGHT SPOT DETECTION AND CLASSIFICATION METHOD FOR A VEHICULAR NIGHT-TIME VIDEO IMAGING SYSTEM

TECHNICAL FIELD

The present invention relates to night-time video imaging system for a motor vehicle, and more particularly to a method of detecting and classifying bright spots imaged by a forward-looking monochrome video camera.

BACKGROUND OF THE INVENTION

With the advent of low cost video imaging devices and digital signal processors, video imaging has been applied to a variety of forward-looking vehicle applications. Night-time and other low-visibility driving conditions are especially challenging, and certain applications such as automatic high beam headlamp control are specifically directed to those driving conditions. The video images under such conditions contain bright spots of various sizes and shapes due to vehicle lights, other light sources and reflectors, and it can be difficult to distinguish bright spots due to vehicle lights from other bright spots, particularly when a monochrome video imager is utilized. Accordingly, what is needed is a reliable methodology for detecting and classifying bright spots imaged by a forward-looking monochrome video camera during night-time operation of a motor vehicle.

SUMMARY OF THE INVENTION

The present invention is directed to an improved method of detecting and classifying bright spots imaged by a forward-looking monochrome video camera during night-time operation of a host vehicle to determine the presence of leading and on-coming vehicles. A specified region-of-interest in each image frame is globally scanned to adaptively detect the bright spot contours, and search windows bounding the larger bright spot contours are locally scanned to adaptively detect individual bright spot contours that were fused in the global scan. A sensitive area within the region-of-interest is locally scanned to adaptively detect dim taillights of a leading vehicle, and path prediction of the host vehicle is used for frame-to-frame tracking of detected spots. Detected spots are classified depending on their location and frame-to-frame movement within the region-of-interest and their glare and pairing characteristics.

DESCRIPTION OF THE PREFERRED EMBODIMENT

The method of the present invention is disclosed herein in the context of a headlamp control system where a forward-looking video image is processed to detect and classify bright spots associated with leading and on-coming vehicles. However, it will be understood that the disclosed detection and classification methodologies are also applicable to night-time vision systems other than headlamp control.

Figure 1:
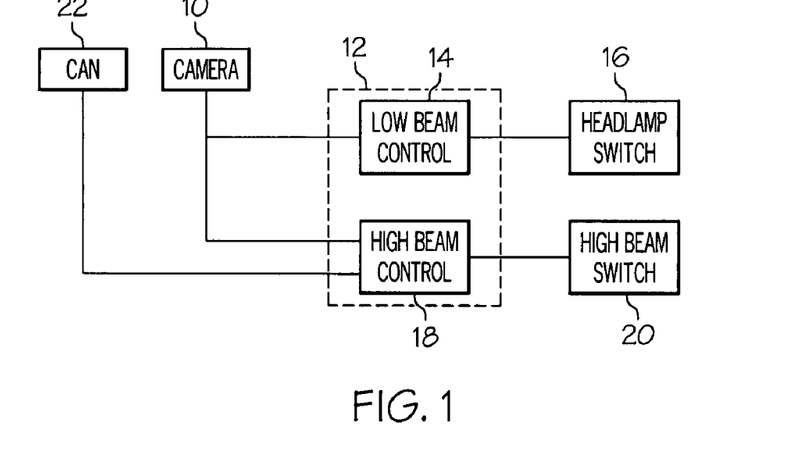
FIG. 1 is a block diagram of a motor vehicle control system incorporating the detection and classification methodologies of the present invention for automatic high beam headlamp control.

Referring to FIG. 1, the depicted block diagram is a representation of an automatic motor vehicle headlamp control system including a forward-looking monochrome video camera 10 and an image processor 12 for carrying out an image processing method for detecting and classifying bright spots imaged by the camera during night-time driving of the vehicle. The camera 10 is a single monochrome video camera that is mounted in the host vehicle to produce digital video images of a scene in the vehicle's forward travel path. The video image data can be used for headlamp activation (i.e., low beam) control as indicated by the blocks 14 and 16, although the present invention is concerned primarily with a high beam headlamp control (block 18) that automatically activates and de-activates the headlamp high beam switch (block 20) depending on whether the video images reveal the lights of other on-coming or in-path vehicles. The high beam control also utilizes pertinent non-video information such as the vehicle speed and yaw rate, which information can be obtained from a vehicle data (CAN) bus as indicted by the block 22.

Figure 2:
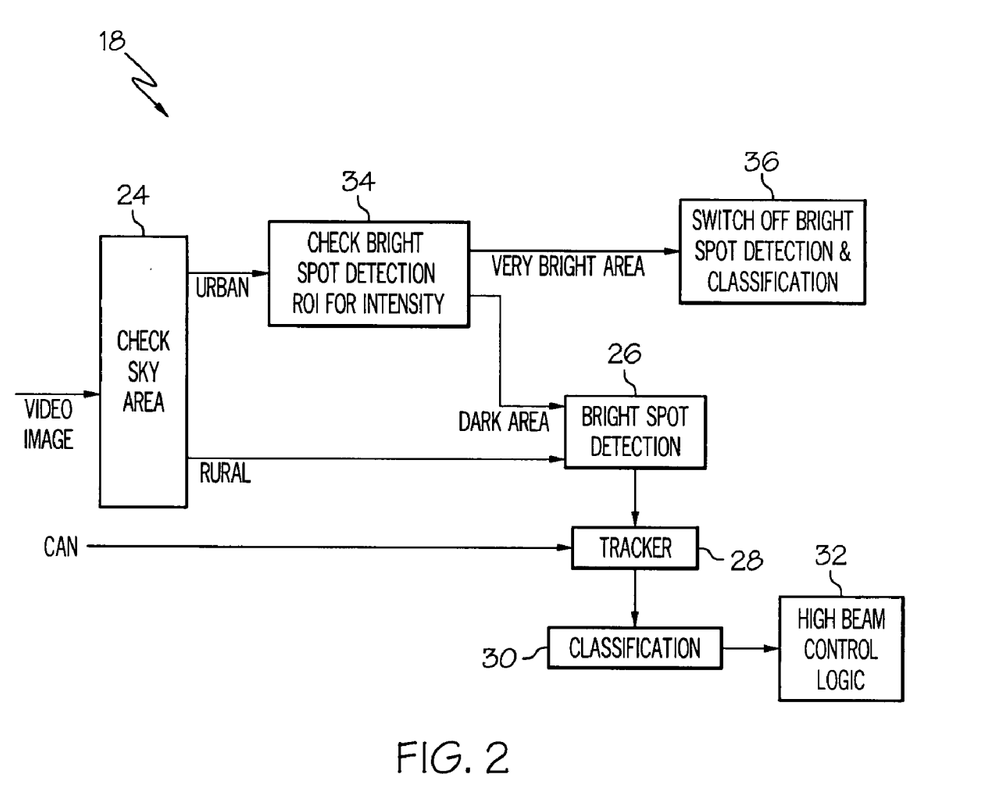
FIG. 2 is a block diagram of a high beam control method included in the system block diagram of FIG. 1.

The block diagram of FIG. 2 describes the overall functionality of the high beam control block 18. Referring to FIG. 2, the video images from camera 10 are supplied to block 24, which examines the average pixel brightness in an upper (sky) portion of the video image to determine whether the host vehicle is in an urban environment or a rural environment. If the vehicle is in a rural (dark sky) environment, use of the high beams may be appropriate and the blocks 26, 28, 30 and 32 are executed to detect, track and classify bright spots in the video image and to activate or deactivate the high beams accordingly. If the vehicle is in an urban (bright sky) environment, the block 34 examines the average pixel brightness in a predefined region-of-interest (ROI) corresponding to that portion of the imaged scene in which other vehicles could potentially be present. If the average brightness in the ROI exceeds a threshold, use of the high beams is inappropriate and block 36 signals deactivation of the high beams and disables the bright spot detection and classification functions of the system. If the average brightness in the ROI does not exceed the threshold, use of the high beams may be appropriate and the blocks 26, 28, 30 and 32 are executed as when the vehicle is in a rural environment.

In general, the bright spot detection step of block 26 identifies individual bright spots in the ROI and examines characteristic features of the identified spots to distinguish spots due to vehicle headlights or taillights from spots due to other sources or reflective objects. Block 28 tracks the identified bright spots from frame to frame, and predicts a location for each spot based on its trajectory in the field-of-view and various other parameters such as the host vehicle speed and yaw rate. The block 30 classifies the identified bright spots as "vehicle" or "non-vehicle" based on information from blocks 26 and 28, as well as the classification history. Finally, High Beam Control Logic block 32 activates or deactivates the high beam light switch 20 depending on the outcome of blocks 30 and 34. In general, block 32 activates the high beam switch 20 in rural or dark urban environments, except when a detected bright spot is classified as "moving object", "taillight" or "headlight".

Figure 3:
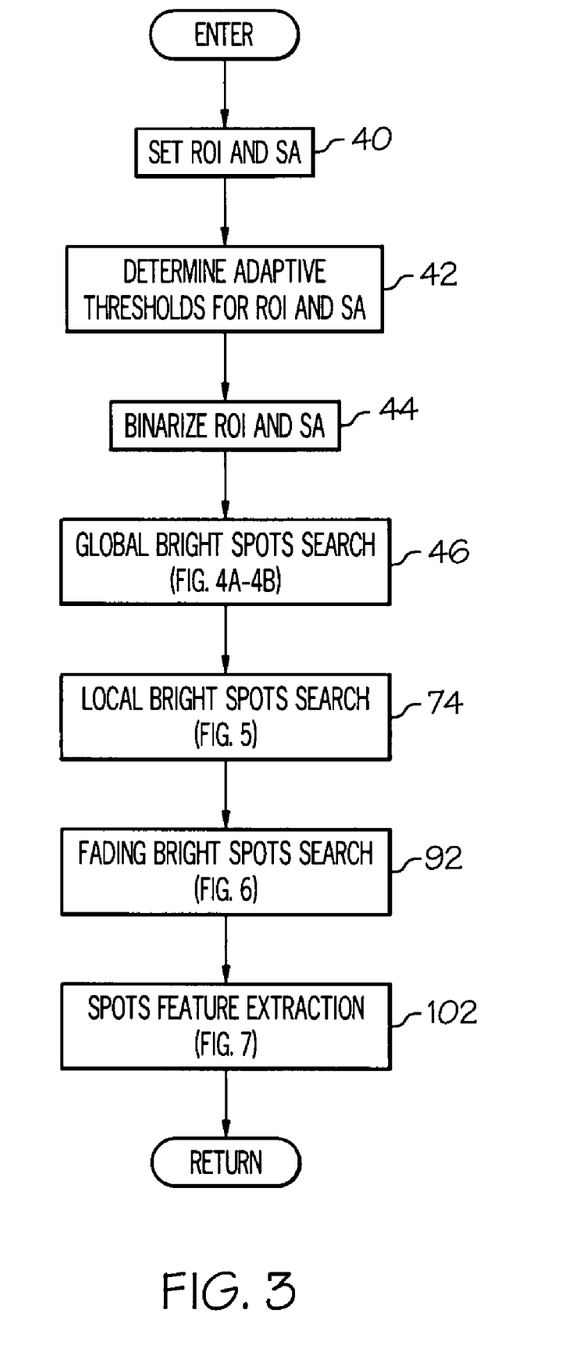
FIG. 3 is a flow diagram of a bright spot detection step included in the high beam control method block diagram of FIG. 2.

The flow diagram of FIG. 3 describes the overall functionality of the bright spot detection block 26. Bright spot detection is applied to the predefined region of interest (ROI), to a sensitive area (SA) within the ROI, and potentially to one or more fading spot search windows. The sensitive area (SA) is a predefined sub-region of the ROI, and corresponds to a portion of the image within which lights of distant vehicles tend to appear. If the taillights of an in-path vehicle are fading due to increasing distance from the host vehicle, the fading spot search window is used to track the taillights until they disappear.

Referring to FIG. 3, block 40 establishes both the ROI and SA, and block 42 determines adaptive thresholds for binarizing the ROI and SA portions of the image. The adaptive thresholds are defined by generating histograms for the respective regions of the image to characterize the intensity distribution, and calculating a threshold based on the histogram data. The thresholds are adaptive in the sense that they depend on intensity distribution in the respective regions of the image, on frame-to-frame changes in intensity distribution, and on changes in intensity distribution due to different weather conditions. Block 44 binarizes the ROI and SA regions of the image using the respective adaptive thresholds of block 42. In the illustrated embodiment, pixels whose brightness exceeds the respective adaptive threshold are marked with a logic one value (i.e., 1-pixels), and the remaining pixels are marked with a logic zero value (i.e., 0-pixels).

Figure 4A:
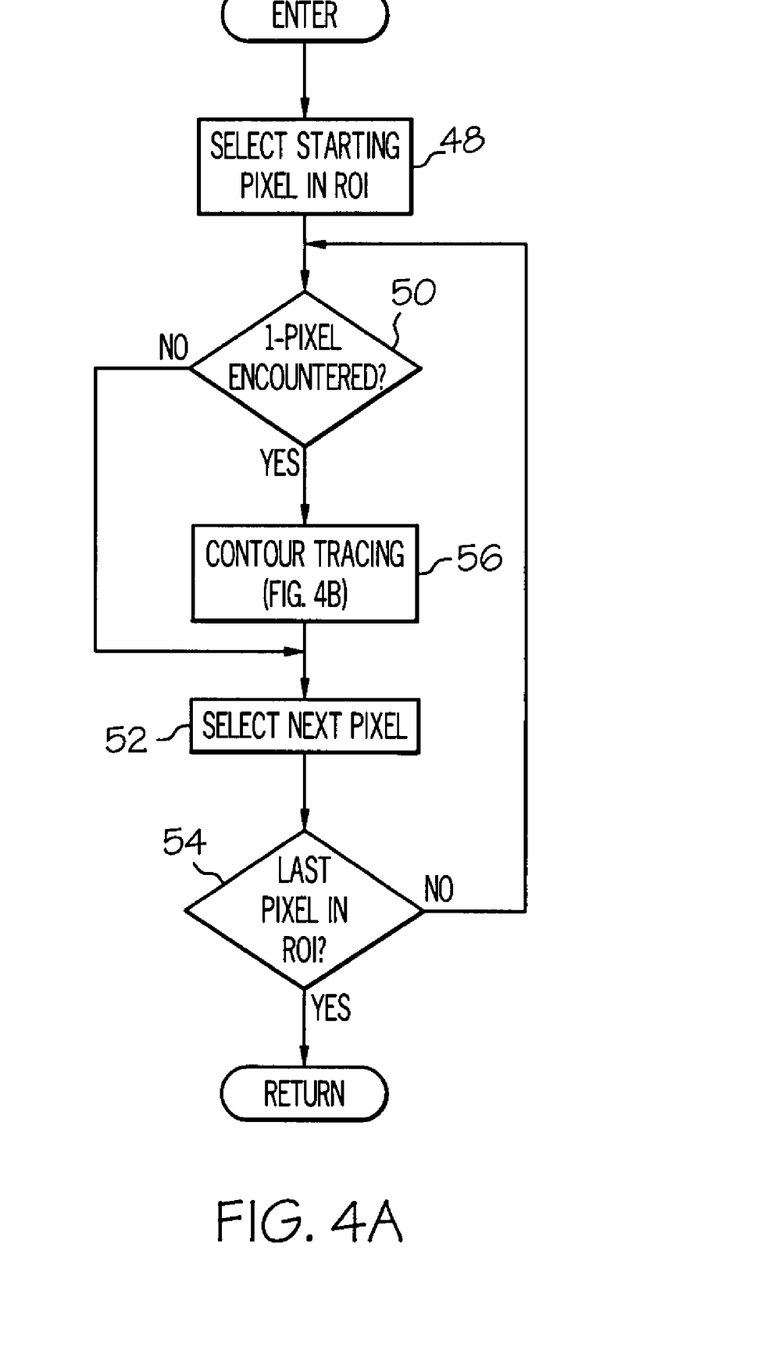
FIGS. 4A-4B together form a flow diagram detailing a portion of the flow diagram of FIG. 3 pertaining to global bright spot detection in a region of interest.

Block 46 signifies a global bright spot search routine for detecting all potential vehicle lights within the ROI (including the sensitive area SA). This involves searching for a 1-pixel in the binarized ROI data and determining the contour or perimeter of the grouping of 1-pixels that are contiguous with the identified pixel. Referring to FIG. 4A, blocks 48-54 search the binarized ROI data beginning with the left-top pixel. Block 48 defines the initial pixel in the search and block 50 determines if that pixel is a 1-pixel. If not, block 52 locates the next pixel, and block 50 determines if that pixel is a 1-pixel. This process continues until the entire ROI has been searched, as determined by block 54. Each time block 50 is answered in the affirmative (i.e., a 1-pixel is found), block 56 is executed to carry out a contour tracing routine to trace the contour of the bright spot to which the identified 1-pixel belongs.

Figure 4B:
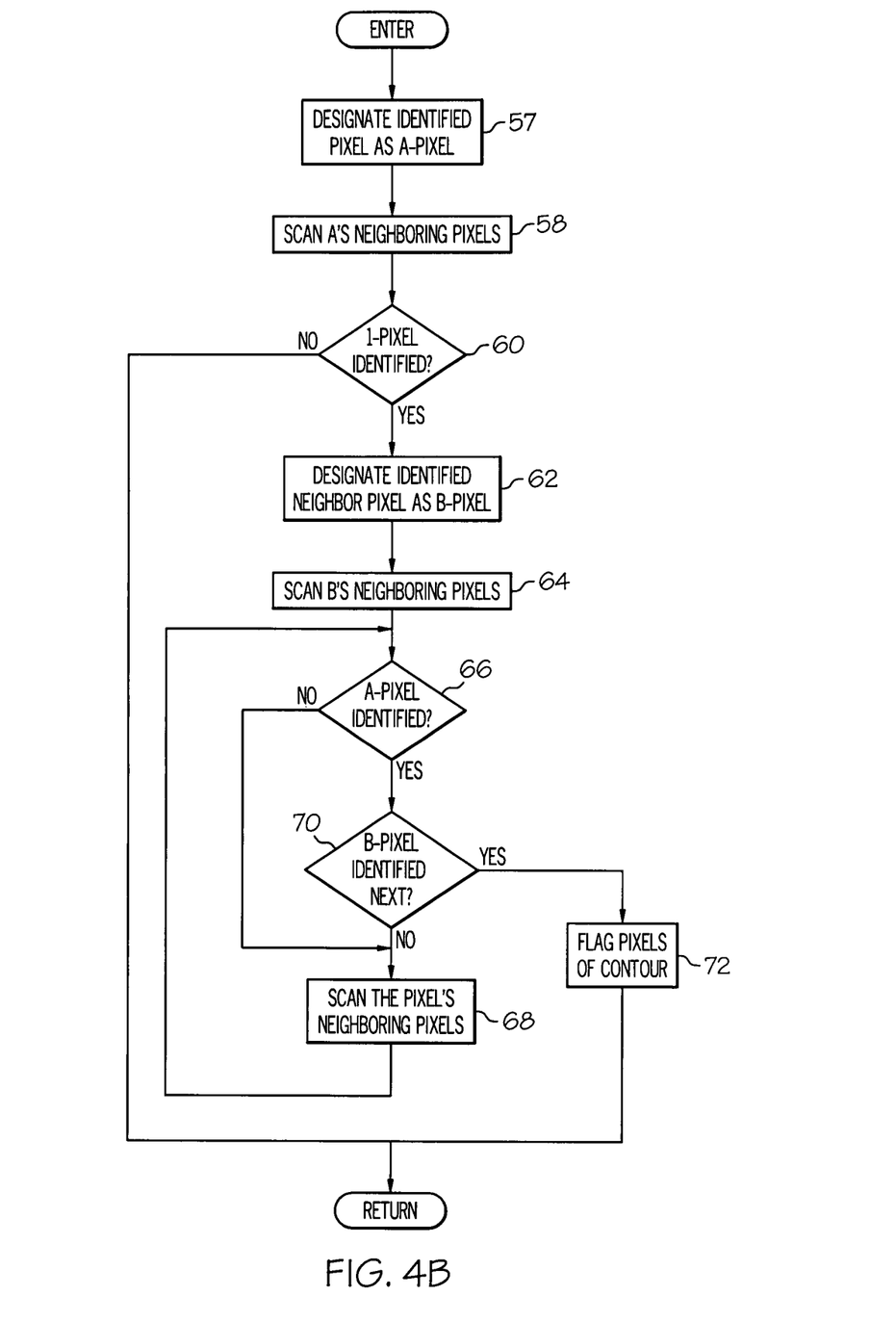

The flow diagram of FIG. 4B describes the contour tracing block 56 of FIG. 4A in detail. Referring to FIG. 4B, Blocks 57 designates the identified 1-pixel with the letter A, and blocks 58-60 scan the eight pixels surrounding the A-pixel (i.e., the neighbors of the A-pixel) to determine if another 1-pixel can be found. The neighbor pixels are scanned in a clockwise sequence, starting with the neighbor pixel to the right of the A-pixel. If all eight neighbor pixels are all 0-pixels, block 60 is answered in the negative, and the global search routine blocks 50-52 examine the next pixel of the ROI. However, if a 1-pixel is encountered in the clockwise search, a bright spot is detected, and block 62 designates the encountered 1-pixel with the letter B. Block 64 then begins to trace the contour of the detected bright spot by performing a clockwise scan of the eight neighbor pixels of the B-pixel. One of these neighbor pixels is the previous pixel of the coutour (the A-pixel, in this case), and block 64 begins the clockwise scan with the neighbor pixel that is two positions away from the previous pixel in the clockwise direction. When a 1-pixel is encountered, block 66 determines if it is the A-pixel. If not, block 68 scans the eight neighbor pixels of the encountered 1-pixel in a clockwise sequence, starting at a neighbor pixel two positions away from the previous pixel of the contour (the B-pixel, in this case). This process is continued until the A-pixel is encountered and block 66 is answered in the affirmative. At that point, block 70 determines if the B-pixel (i.e., the second pixel of the contour) follows the A-pixel. If not, the block 68 scans the eight neighboring pixels of the A-pixel as described above. If block 70 determines that the B-pixel follows the A-pixel, the contour is completely traced and block 72 flags the pixels of the contour, as well as those circumscribed by the contour, so that they will be ignored by global search routine block 52. Of course, the bright spot contours could just as easily be traced in the counter-clockwise direction, with different rules for defining the scan starting points.

In the manner described above, the global bright spot search (i.e., block 46 of FIG. 3) scans the ROI of each video frame and traces the contours of all bright spots therein. Since the threshold used to binarize most of the ROI is set relatively low to pick up all bright spots (including dim taillights), two or more bright spots may be joined or fused in a single contour of pixels. For example, bright spots corresponding to the headlights of a distant on-coming vehicle may be detected as a single contour in the global search. For this reason, the global bright spot search is followed by a local bright spot search, as designated by block 74 in FIG. 3. In general, the local bright spot search defines search windows bounding relatively large contours traced by the global bright spot search, binarizes each search window based on adaptive thresholds determined for that search window, and traces individual contours in each search window. This process, when performed, serves to split fused bright spots into two or more separate contours.

Figure 5:
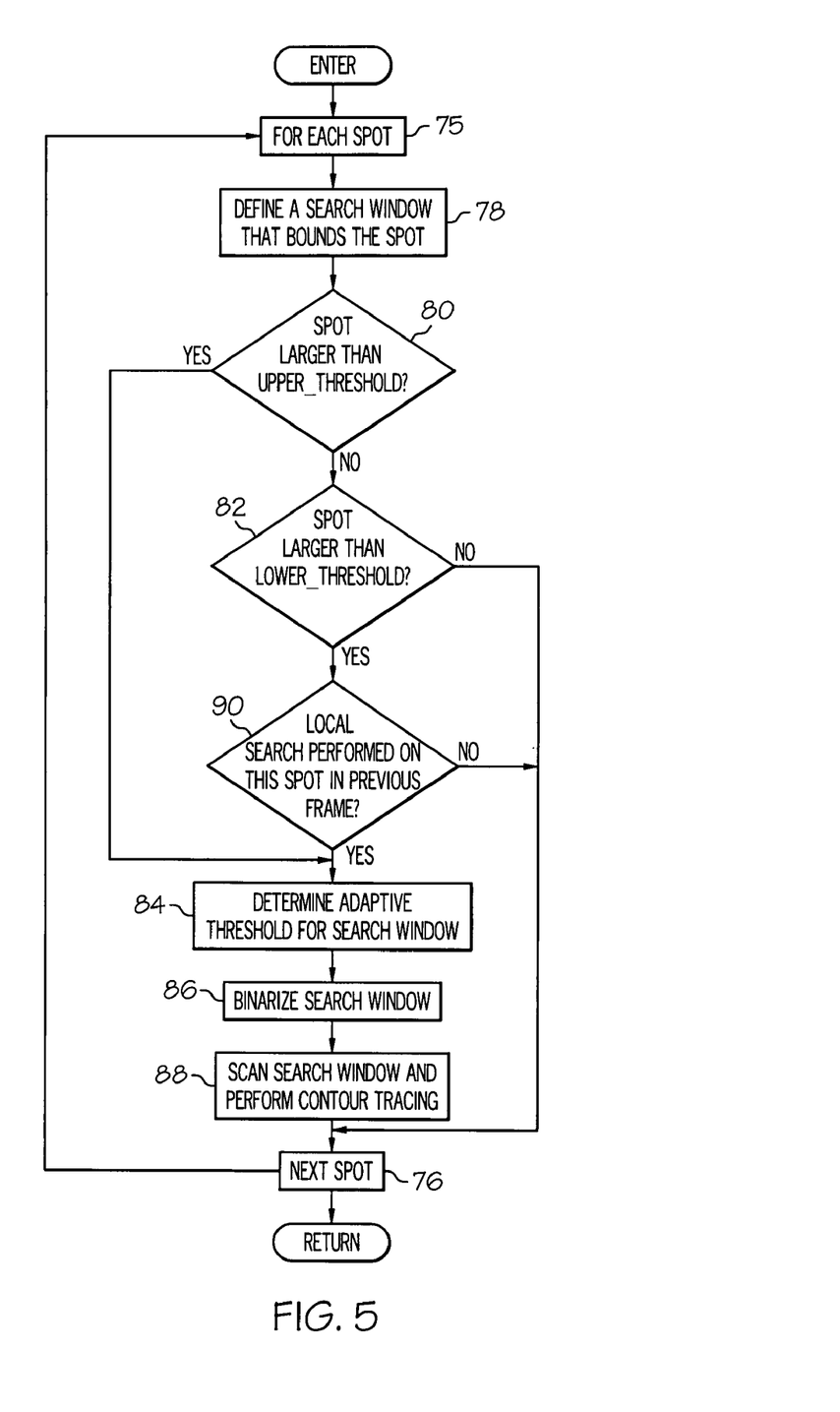
FIG. 5 is a flow diagram detailing a portion of the flow diagram of FIG. 3 pertaining to local bright spot detection in a search window bounding a detected bright spot.

The flow diagram of FIG. 5 describes block 74 of FIG. 3 in detail. Referring to FIG. 5, the FOR and NEXT blocks 75 and 76 signify that the blocks 78-90 are executed for each bright spot detected by the global bright spot search of FIGS. 4A-4B. Block 78 defines a search window bounding the respective spot, and blocks 80-82 determine if local bright spot detection should be performed. In effect, the blocks 80 and 82 define a hysteresis band bounded by predefined upper and lower thresholds. If the size of the current spot is larger than the upper threshold (UPPER_THRESHOLD), blocks 84-88 are executed to perform local bright spot detection.

Conversely, if the size of the current spot is smaller than the lower threshold (LOWER_THRESHOLD), local bright spot detection is not performed, and block 76 selects the next spot. For spots having sizes intermediate the lower and upper thresholds, block 90 is executed to determine if local bright spot detection was performed for that spot in the previous video frame. If so, local bright spot detection is also performed for that spot in the current video frame; if not, local bright spot detection is not performed and blocks 75-76 select the next spot. Taking into account the local bright spot detection history in this way provides more reliable and consistent bright spot detection when the distance between the host vehicle and another vehicle is changing.

When blocks 80-82 and 90 determine that local bright spot detection is appropriate, the block 84 generates a histogram for the respective search window to characterize the intensity distribution within the search window, and calculates an adaptive threshold based on the histogram data. Block 86 binarizes the search window using the adaptive threshold of block 84, and block 88 scans the search window and traces the contour(s) of pixel groupings therein as described above in respect to FIGS. 4A-4B.

Figure 6:
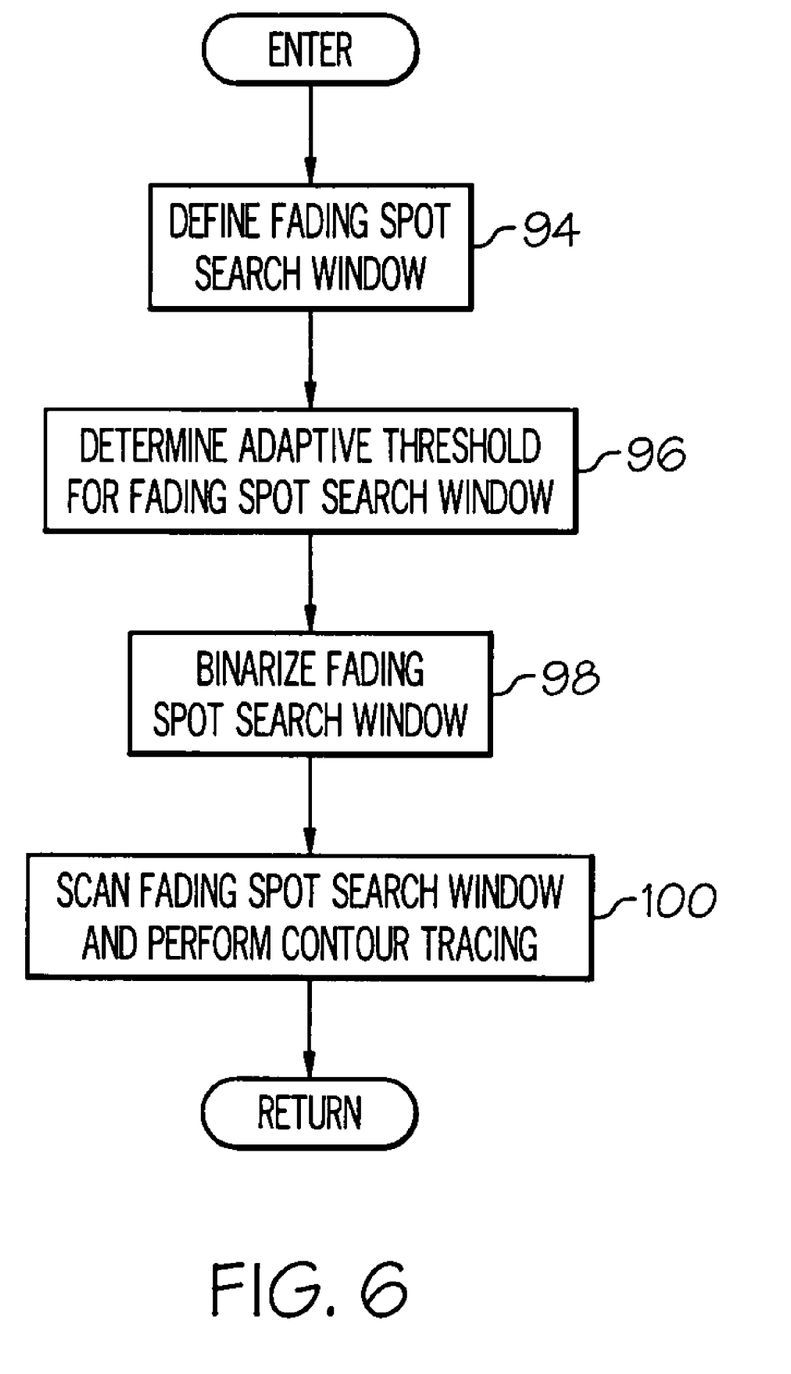
FIG. 6 is a flow diagram detailing a portion of the flow diagram of FIG. 3 pertaining to fading bright spot detection in predicted search window.

Referring again to FIG. 3, the block 92 designates a fading bright spots search for identifying vehicle lights that fade out of view. Essentially, a fading spot is defined as a spot that was detected in the previous frame but is not detected in the spot's predicted location in the current frame, where the tracker 28 provides the predicted location. For each such fading spot, the fading bright spots search performs the steps designated by blocks 94-100 of FIG. 6. Referring to FIG. 6, the blocks 94 and 96 respectively define a search window surrounding the expected location of the fading bright spot, and calculate an adaptive threshold based on a histogram of the defined search window. Block 98 binarizes the search window using the adaptive threshold of block 96, and block 100 scans the search window and traces the contour(s) of pixel groupings therein as described above in respect to FIGS. 4A-4B.

Block 102 of FIG. 3 designates a feature extraction routine that is applied to the bright spots detected by the global, local and fading bright spots search routines of blocks 46, 74 and 92. The purpose of the feature extraction is to distinguish vehicle lights from bright spots associated with other sources or reflections or glare due to precipitation or fog. Blocks 104-114 of FIG. 7 detail the feature extraction processes.

Figure 7:
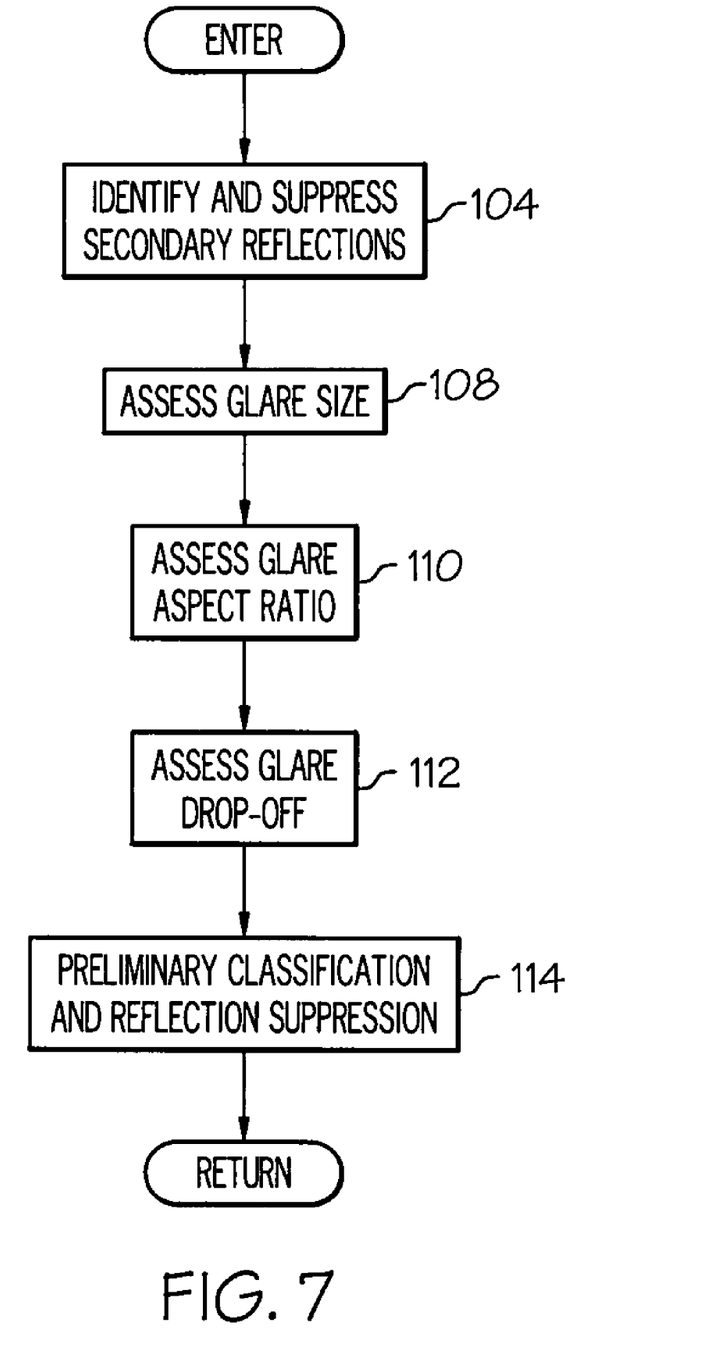
FIG. 7 is a flow diagram detailing a portion of the flow diagram of FIG. 3 pertaining to spot feature extraction and preliminary classification.
Figure 8:
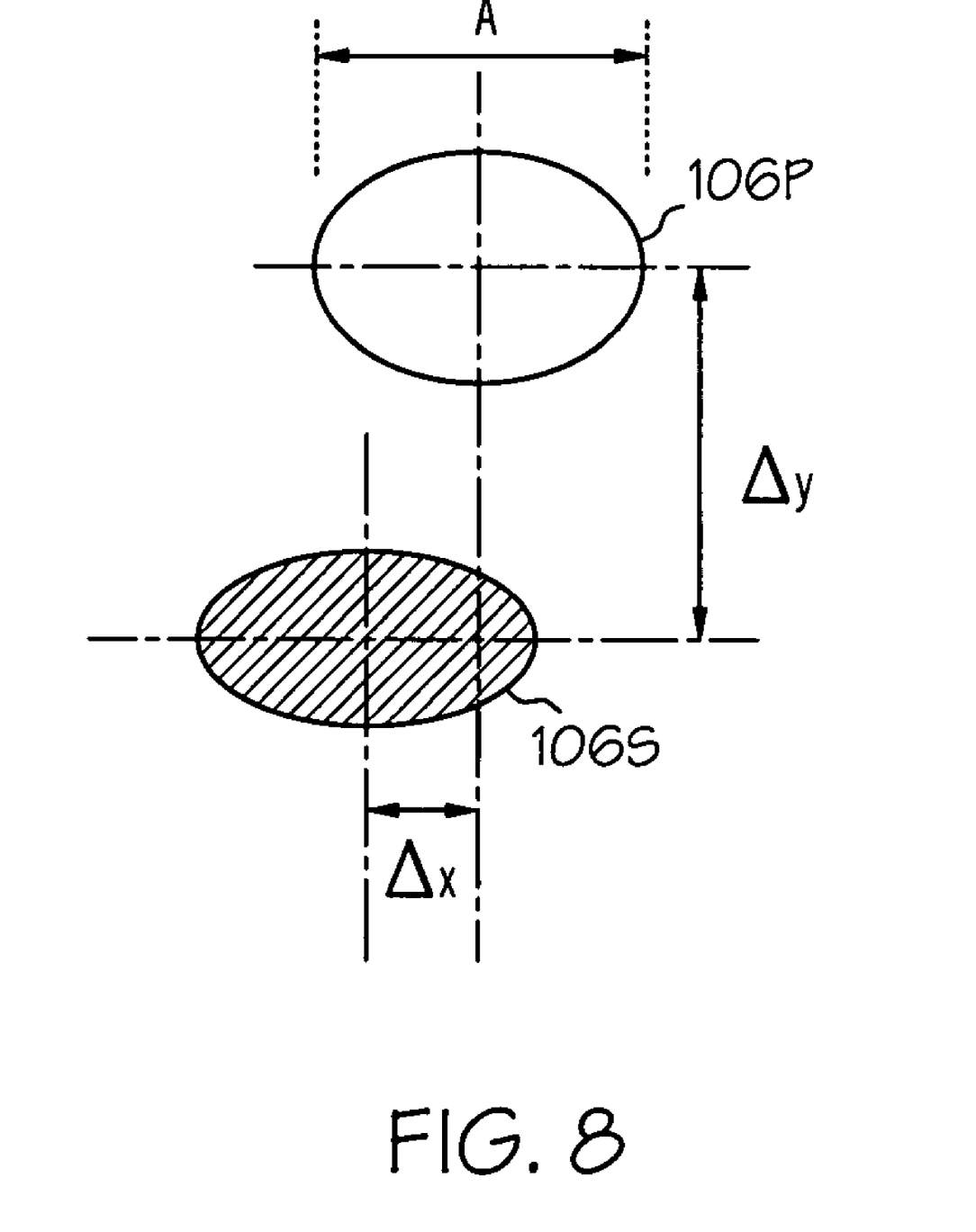
FIG. 8 is a diagram illustrating suppression of secondary bright spots due to road reflections.

Referring FIG. 7, block 104 designates a process for identifying and suppressing secondary or ghost bright spots that occur due to road reflections from vehicle lights. The process is illustrated in FIG. 8, where the reference numerals 106P and 106S respectively designate primary and secondary bright spots respectively associated with a vehicle light (headlight or taillight) and a road reflection of that light. The dimension "A" is the width of the primary bright spot 106P, and the centroids of the bright spots 106P and 106S are used to determine both their relative vertical offset (Δy) and their relative horizontal or lateral offset (Δx). If ABS(Δx)<=A/2 and Δy<a predefined threshold, the bright spot 106S is recognized as a ghost reflection and is suppressed.

Blocks 108-112 designate routines for assessing the glare size, glare aspect ratio and glare drop-off in regions surrounding an identified bright spot in order to identify and suppress bright spots due to reflectors on poles and reflections from traffic signs and other reflecting objects. Block 114 then performs a preliminary classification based on the glare measurements.

Figure 9:
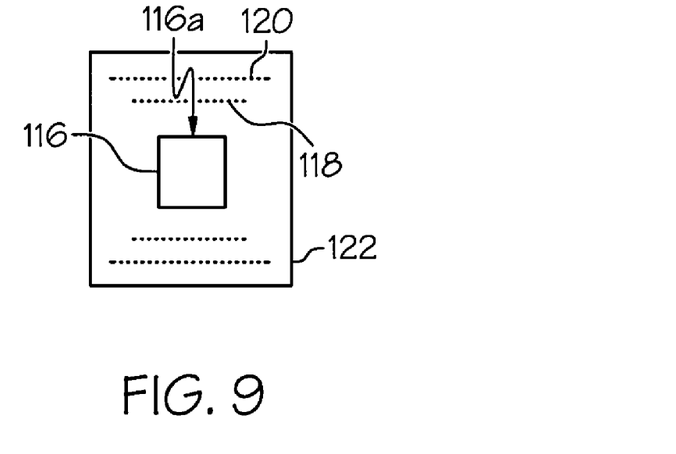
FIG. 9 is a diagram illustrating glare size assessment.

The glare size calculation of block 108 is illustrated in FIG. 9, where the reference numeral 116 designates a box bounding a detected bright spot. The glare size is determined by scanning rows of pixels in pyramidal regions above and below the bounding box 116, and comparing the average intensity of each row to the average intensity of the previous row. For the region above bounding box 116, for example, the average pixel intensity in row 118 is compared to the average pixel intensity in the top row 116a of bounding box 116. If the pixel intensity in row 118 is less than 50% of the pixel intensity in row 116a, the extent of the glare is considered to end at the top row 116a of bounding box 116. If the pixel intensity in row 118 is at least 50% of the pixel intensity in row 116a, the average intensity in the next row 120 is compared with the average pixel intensity in row 118. If the pixel intensity in row 120 is less than 50% of the pixel intensity in row 118, the extent of the glare is considered to end at row 118; but if the pixel intensity in row 120 is at least 50% of the pixel intensity in row 118, the process is continued in the vertical direction until the 50% drop-off criterion is met. Once the process has been carried to a conclusion both above and below bounding box 116, a second bounding box 122 is defined to represent the vertical extent of the detected glare, and the size difference between bounding boxes 116 and 122 provides a measure of the glare size.

Figure 10:
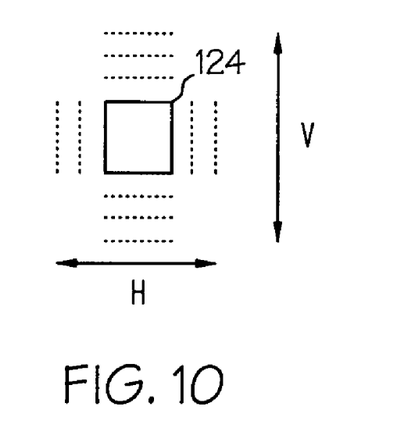
FIG. 10 is a diagram illustrating glare aspect ratio assessment.

The glare aspect ratio calculation of block 110 is illustrated in FIG. 10, where the reference numeral 124 designates a box bounding a detected bright spot. The aspect ratio is determined by assessing the extent of glare vertically and horizontally with respect to the centroid of the detected spot. In each direction, glare extent is determined by comparing the average pixel intensity in successive rows or columns vertically or horizontally removed from the bounding box 124, and marking the glare extent as the row or column at which the average pixel intensity drops off by at least 50%. Once the process has been carried to a conclusion in all four directions about bounding box 124, the vertical glare extent V is divided by the horizontal glare extent H to provides a measure of the glare aspect ratio.

The glare drop-off calculation of block 112 of FIG. 7 is similar to the glare size calculation except that the glare drop-off criterion is 25% instead of 50%. The glare aspect ratio drop-off may be similarly determined; that is, by using a drop-off criterion is 25% instead of 50%.

The preliminary classification block 114 suppresses those bright spots that are considered to be due to non-vehicle objects based on the glare features determined by blocks 108-112. Compared to non-vehicle bright spots, the glare surrounding a vehicle bright spot is larger in size and area, and has a smaller aspect ratio. The difference in glare aspect ratio is especially pronounced in the case of a bright spot due to a pole reflector. Also, the glare size of a bright spot corresponding to an oncoming headlight increases gradually as the oncoming vehicle approaches the host vehicle, but the glare aspect ratio remains relatively constant. Finally, the glare drop-off size of a light source is much larger than the glare drop-off size of a reflecting object. Rules based on these general considerations are formulated and applied to glare measurements of blocks 108-112. Bright spots that can be clearly distinguished from vehicle lights on the basis of the rules are suppressed, and the remaining bright spots are passed on to the classification block 30 of FIG. 2.

Figure 11:
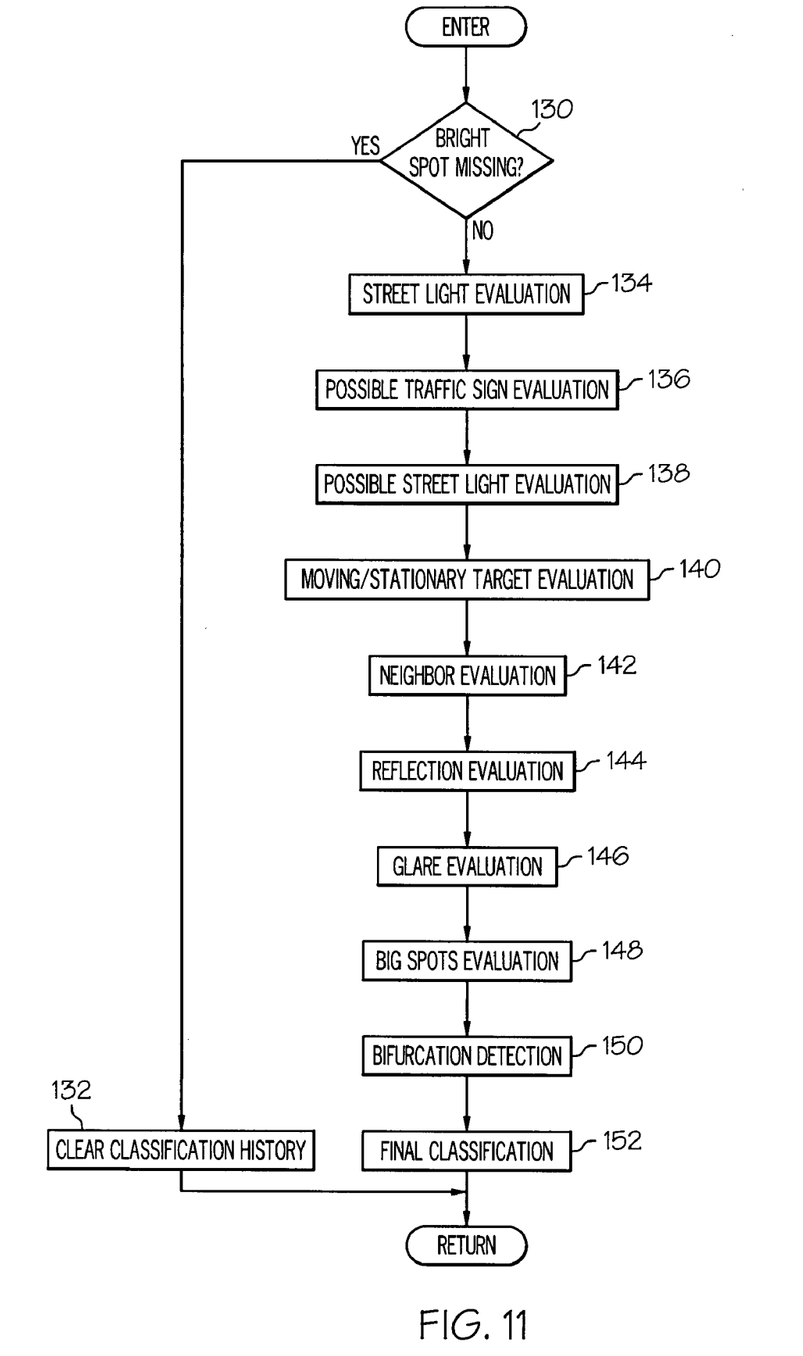
FIG. 11 is a flow diagram of a bright spot classification step included in the high beam control method block diagram of FIG. 2.

The flow diagram of FIG. 11 describes the overall functionality of the bright spot classification block 30 of FIG. 2. In general, the block 30 receives information regarding the detected bright spots in the current video frame and identifies certain characteristics or parameters of the bright spots that help distinguish "vehicle" bright spots from "non-vehicle" bright spots. Referring to FIG. 11, block 130 is initially executed to determine if any bright spots detected in the previous several frames are missing in the current frame. If a previously detected spot is found missing for a few consecutive frames, it is designated as a "missing spot", and block 132 clears the classification history of that spot. The detected spots, whether new or repeating from a previous frame, are evaluated by blocks 134-150, and the results of the evaluations are provided to the final classifier block 152. The flow diagram of FIG. 14 describes the functionality of the final classifier block 152.

Figure 12:
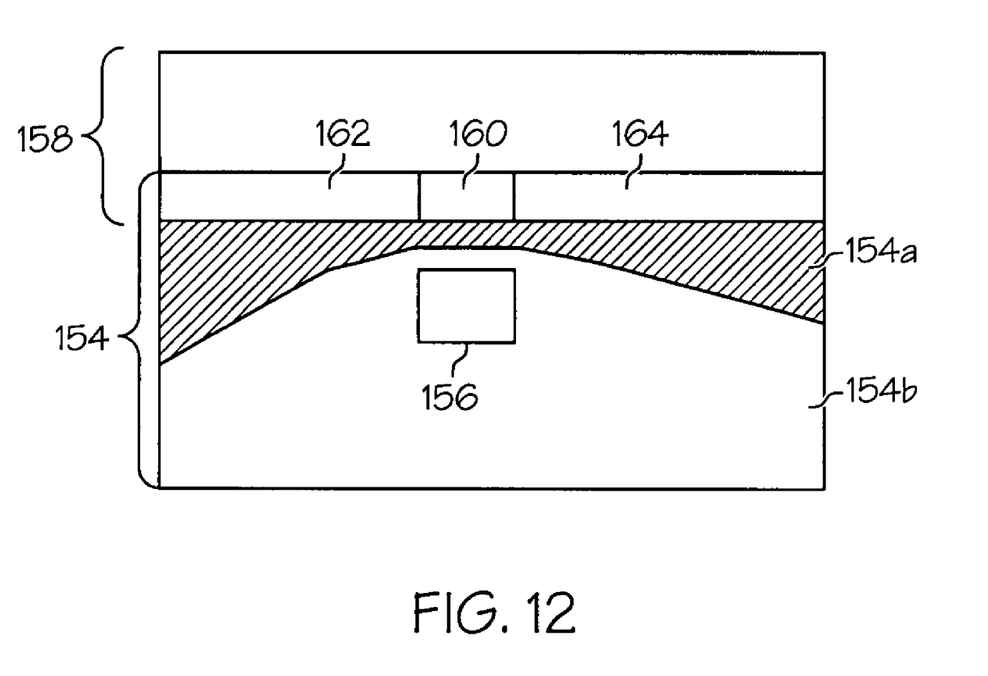
FIG. 12 is a diagram of an image frame produced by the control system of FIG. 1, showing image regions utilized by the bright spot classification flow diagram of FIG. 11.

Blocks 134, 136 and 138 preliminarily classify detected bright spots based on their location within the image field-of-view. As illustrated in FIG. 12, the image field-of-view is divided into various predefined regions. The region-of-interest (ROI) and sensitive area (SA) mentioned above in respect to the bright spot detection routine are respectively designated by the reference numerals 154 and 156. The reference numeral 158 designates the SKY region of the image, which comprises the upper portion of the image and overlaps an upper band of the ROI 154. As explained above, the ROI 154 is used to detect bright spots possibly associated with vehicles, the sensitive area (SA) 156 is used to detect dim taillights of an in-path vehicle, and the SKY region 158 is used to distinguish between urban and rural environments. The overlap band between the ROI and SKY regions 154 and 158 is divided into a center overlap region 160 that is vertically aligned with the sensitive area (SA) 156, and a pair of lateral overlap regions 162 and 164 on either side of the center overlap region 160. The center overlap region 160 is used to classify detected bright spots that may be due to an in-path vehicle on a hill, and the lateral overlap regions 162 and 164 are used to classify detected bright spots that may be due to street lights. Finally, the portion of the ROI 154 below the overlap regions 160-164 is divided into an upper region 154a and a lower region 154b. The upper region 154a is used to preliminarily classify detected bright spots as traffic signs, while the lower region 154b is used to preliminarily classify detected bright spots as vehicle lights.

Referring again to FIG. 11, block 134 identifies detected bright spots lying in the overlap band between the ROI and SKY regions 154 and 158. Any bright spot in the center overlap region 160 is preliminarily classified as a "vehicle" if it is of sufficient size, and any bright spot initially detected in one of the lateral overlap regions 162 or 164 is preliminarily classified as a street light. Block 136 preliminarily classifies any detected bright spots that consistently lie in the upper region 154a of ROI 154 as traffic signs. And block 138 preliminarily classifies any detected bright spots that consistently lie in the lateral overlap regions 162 or 164 as street lights. Any bright spots preliminarily classified as street lights or traffic signs are ignored unless subsequently paired with another bright spot, as described below in reference to block 142.

Figure 13:
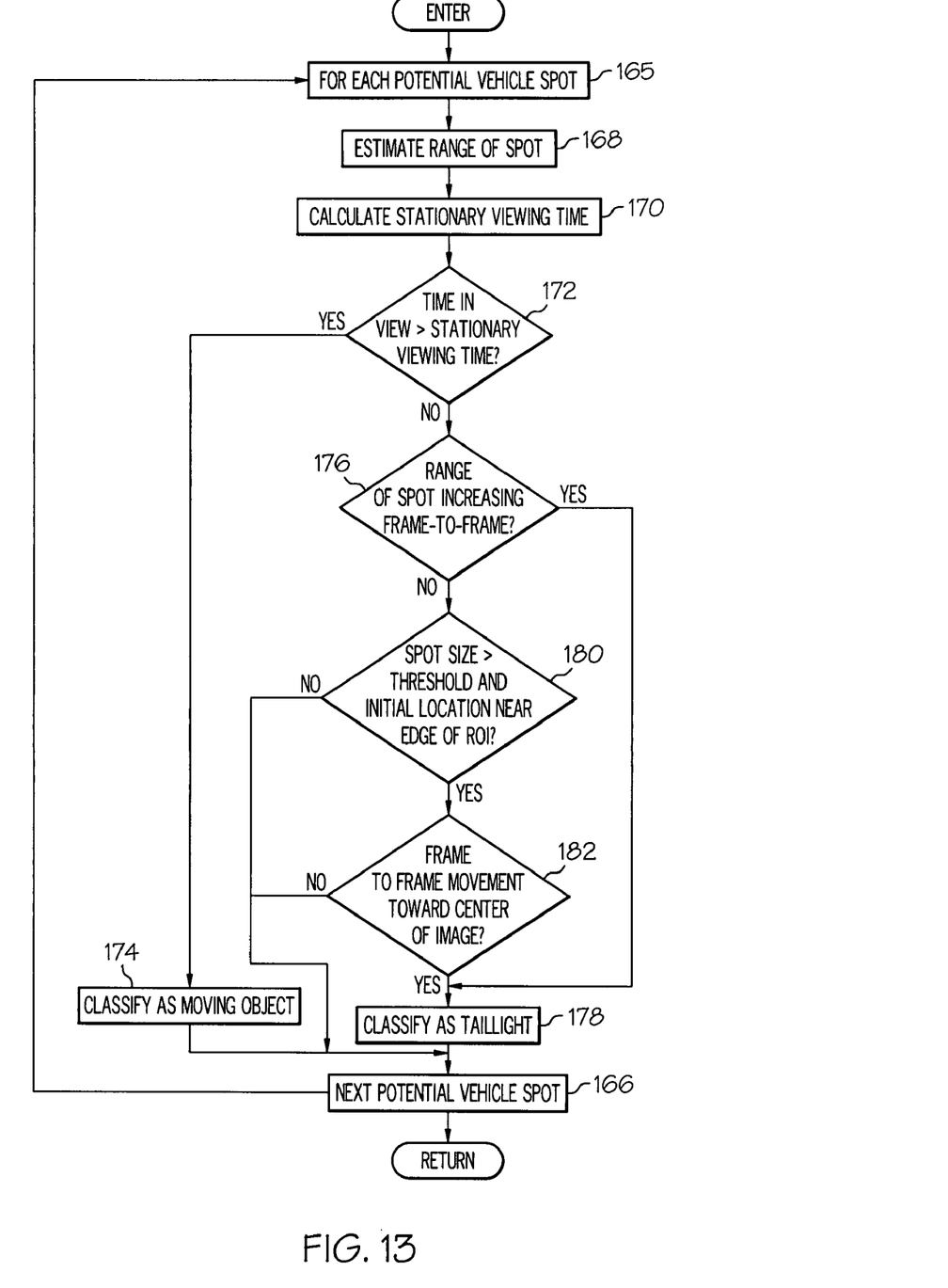
FIG. 13 is a flow diagram detailing a portion of the flow diagram of FIG. 11 pertaining to moving/stationary object evaluation.

Block 140 of FIG. 11 classifies potentially vehicular bright spots based on their frame-to-frame change in location within the video image. Referring to the flow diagram of FIG. 13, blocks 168-182 are executed for each bright spot that can potentially be classified as a vehicle, as indicated by blocks 165-166. Block 168 estimates the range of a given spot from the host vehicle based on its vertical location in the image. Block 170 then calculates a stationary viewing time for the spot based on its range and the speed of the host vehicle, assuming that the spot is due to a stationary object. The tracker 28 tracks the location of the spot, and block 172 determines if the spot remains in view significantly longer than the calculated stationary viewing time; if so, block 174 classifies the spot as a moving object. Block 176 determines if the range of the spot increases in successive image frames, and if so, block 178 classifies the spot as the taillight of a leading vehicle. Finally, blocks 180 and 182 determine if the bright spot is due to an overtaking (i.e., passing) vehicle. If the spot size is larger than a threshold size, initially appears near the left or right edge of the ROI, and then moves toward the center of the ROI, blocks 180 and 182 will both be answered in the affirmative, and block 178 classifies the spot as a taillight of a leading vehicle.

Block 142 of FIG. 11 compares the bright spots not already classified as "taillight" (including bright spots preliminarily classified as street light or traffic sign) for image height and separation distance over multiple successive video frames to identify pairs of spots associated with the lights of a close-range leading or on-coming vehicle. When such a pair of bright spots is identified, they are classified as moving objects.

Block 144 locates bright spots that appear just after the high beams of the host vehicle are activated. Any such spots are classified as a reflection, and are suppressed.

Block 146 evaluates the glare characteristics of bright spots not already classified as reflections or taillights to determine if they are consistent with the glare characteristics of vehicle lights. The glare characteristics include glare size, glare aspect ratio, glare size drop-off and glare aspect ratio drop-off, essentially as defined above in respect to the detection routine of FIG. 7. Spot size and intensity features are also considered. Since the amount and distribution of glare slightly differ depending on vehicle design as well as range and location of an object with respect to the host vehicle, the parameters are compared to a set of empirically determined thresholds to distinguish vehicle lights from other objects. In general, a vehicle bright spot is relatively large, and exhibits both high average intensity and high maximum intensity. Moreover, the glare size of a vehicle bright spot is much larger than the size of the bright spot itself, and increases as it approaches the host vehicle. The glare aspect ratio and aspect ratio drop-off parameters are used to identify glare that extends more horizontally than vertically, as this is also characteristic of a vehicle light. Block 146 evaluates these glare parameters for a calibrated number of successive image frames and the bright spot is classified as "Headlight" if the predefined criteria are satisfied. Block 146 also uses glare parameters to discriminate against bright spots due to close range street poles. The street pole glare is mostly in vertical direction, and bright spots having exaggerated vertical glare are classified as "Street Pole".

Block 148 of FIG. 11 identifies an on-coming traffic situation where conditions render reliable classification difficult and/or time-consuming. Block 148 scans a portion of the ROI where on-coming vehicles can potentially be present, and detects a "Big Spot" condition when a number of large bright spots (or one or more very large high intensity bright spots) are present over several successive image frames. When a "Big Spot" condition is detected, block 148 signals the High Beam Control Logic block 32 of FIG. 2 to immediately deactivate the high beam switch 20.

Finally, block 150 of FIG. 11 checks for a pair of detected bright spots that were previously detected as a single bright spot. This is characteristic of both on-coming vehicle lights and receding in-path vehicle lights. Bright spots satisfying this criterion are classified as "moving object".

Figure 14:
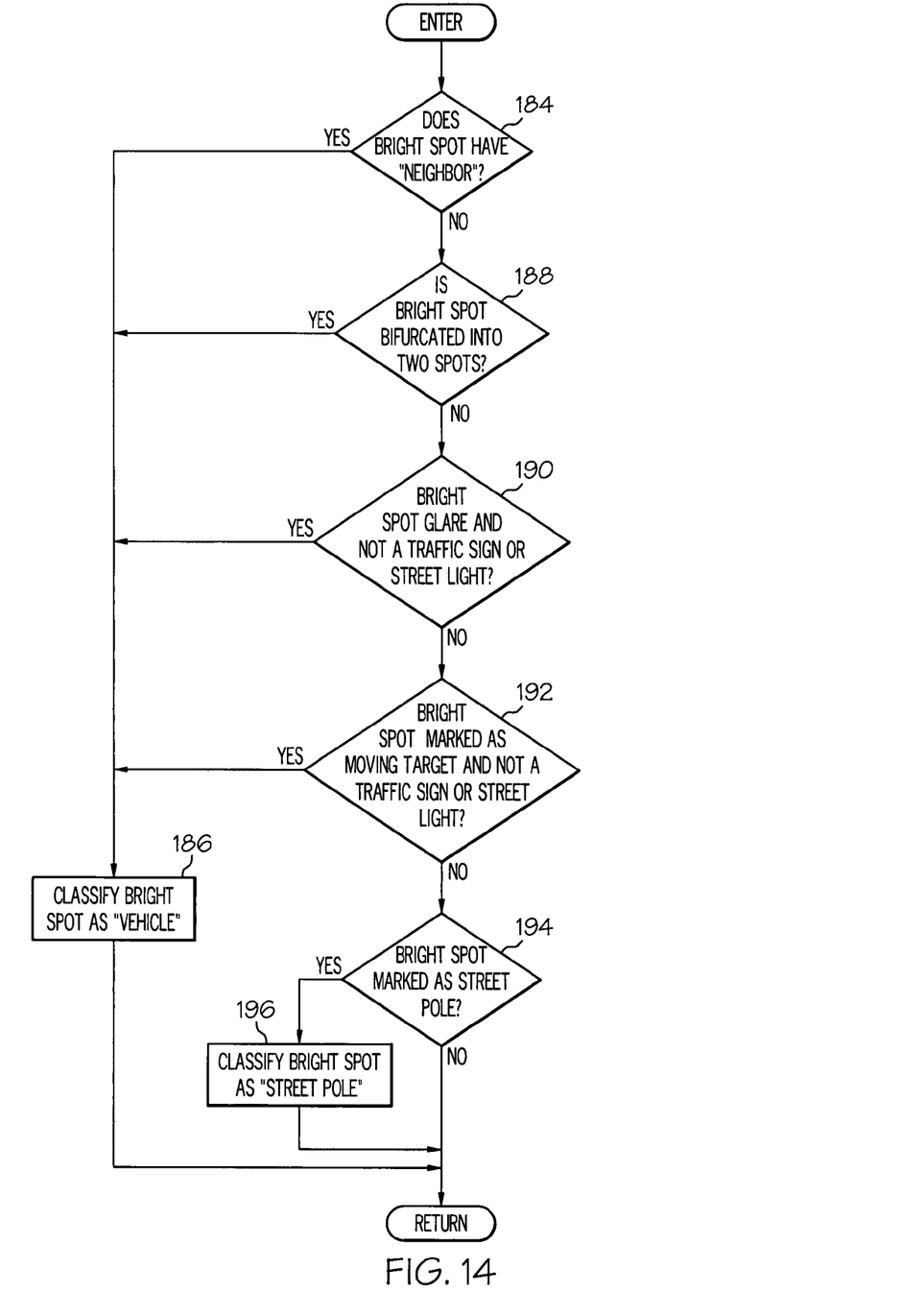
FIG. 14 is a flow diagram detailing a portion of the flow diagram of FIG. 11 pertaining to final classification.

The flow diagram of FIG. 14 describes the functionality of the final classifier block 152. Depending on the preliminary classification results of FIG. 11, the final classification flow diagram of FIG. 14 determines which of the bright spots not already classified as "moving object" or "taillight" or "headlight" can be classified as "vehicle". Blocks 184 and 186 classify any bright spot paired with a "neighbor" (as determined at block 142 of FIG. 11) as "vehicle". Blocks 188 and 186 classify any bright spot pairs that were formerly detected as a single spot (as determined at block 150 of FIG. 11) as "vehicle". Blocks 190 and 186 classify bright spots that exhibit glare (as determined at block 146 of FIG. 11) but have not been preliminarily classified as "traffic sign" or "street light" (by blocks 134-138 of FIG. 11) as "vehicle". And blocks 192 and 186 classify bright spots that are marked as "moving objects" (by blocks 140, 142 or 150 of FIG. 11) but have not been preliminarily classified as "traffic sign" or "street light" (by blocks 134, 136 or 138 of FIG. 11) as "vehicle". Blocks 194 and 196 then classify any remaining bright spots that have been preliminarily classified as "street pole" (by block 146 of FIG. 11) as "street pole".

In summary, the present invention provides a reliable method of detecting and classifying bright spots imaged by a forward-looking monochrome video camera during nighttime operation of a motor vehicle. While the invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A method of detecting and classifying bright spots imaged by a forward-looking monochrome video camera in a host vehicle, comprising the steps of:
   scanning a region of interest in each of a succession of video image frames to detect bright spots potentially corresponding to lights of other vehicles by: (1) performing a global search within the region of interest to detect all bright spots potentially corresponding to a vehicle light, said global search being performed by identifying individual bright pixels within the region of interest and tracing contours of identified bright pixels that are contiguous; and (2) performing a local search to isolate individual bright spots within a detected bright spot that is larger than a first threshold, said local search being performed by defining a search window bounding the traced contour of such detected bright spot, identifying individual bright pixels within said search window, and tracing contours of identified bright pixels that are contiguous;
   evaluating bright spots detected by the global and local searches based on appearance and location in the region of interest over a series of said video image frames; and
   classifying the detected bright spots based on the evaluations.

2. The method of claim 1, including the steps of:
   defining a second threshold that is lower than said first threshold; and
   performing a local search to isolate individual bright spots within a detected bright spot that is smaller than said first threshold but larger than said second threshold if a local search was performed for that bright spot in a previous video image frame.

3. The method of claim 1, including the steps of:
   evaluating relative lateral and vertical offsets of a selected pair of upper and lower detected bright spots to identify a bright spot corresponding to a road reflection of a vehicle light; and
   suppressing such identified bright spot.

4. The method of claim 3, including the step of:
   determining that the lower bright spot is a road reflection if $ABS(\Delta x) <= A/2$ and $\Delta y <$ a predefined threshold, where $\Delta x$ is the relative lateral offset, $\Delta y$ is the relative vertical offset, and A is a width of the upper bright spot.

5. The method of claim 1, where the step of evaluating the detected bright spots includes the steps of:
   preliminarily classifying a detected bright spot as a street light or traffic sign based on its location in the region of interest;
   evaluating a height and separation distance between pairs of detected bright spots to identify paired bright spots corresponding to lights of a target vehicle; and
   suppressing a bright spot preliminarily classified as a street light or traffic sign unless it is also identified as a paired bright spot.

6. The method of claim 1, where the host vehicle has a selectively activated high beam headlamp, and the step of evaluating the detected bright spots includes the steps of:
   identifying bright spots that are detected just after the high beam headlamp of the host vehicle is activated; and
   suppressing the identified bright spots as non-vehicle reflections.

7. The method of claim 1, where the step of evaluating the detected bright spots includes the steps of:
   detecting bifurcation of a detected bright spot into a pair of bright spots over a series of successive video frames; and
   classifying the pair of detected bright spots as a vehicle.

8. The method of claim 1, where the step of evaluating the detected bright spots includes the steps of:
   estimating a range of a detected bright spot based on its location in the region of interest;
   computing a stationary viewing time for the detected bright spot based on the estimated range and a speed of the host vehicle, assuming that the bright spot is due to a stationary object; and
   classifying the bright spot as a moving object if it is detected for a viewing period that exceeds the computed stationary viewing time.

9. The method of claim 1, including the steps of:
   estimating a range of a detected bright spot based on its location in the region of interest; and
   classifying the detected bright spot as a leading vehicle when the estimated range increases in successive image frames.

* * * * *